(12) United States Patent
Hahnl

(10) Patent No.: US 8,327,635 B2
(45) Date of Patent: Dec. 11, 2012

(54) VALVE DEVICE

(75) Inventor: Wolfgang Hahnl, Grimma (DE)

(73) Assignee: Emcon Technologies, LLC, Wilmington, DE (US)

( * ) Notice: Subject to any disclaimer, the term of this patent is extended or adjusted under 35 U.S.C. 154(b) by 743 days.

(21) Appl. No.: 12/445,319

(22) PCT Filed: Oct. 12, 2007

(86) PCT No.: PCT/EP2007/008887
§ 371 (c)(1),
(2), (4) Date: Sep. 1, 2009

(87) PCT Pub. No.: WO2008/046563
PCT Pub. Date: Apr. 24, 2008

(65) Prior Publication Data
US 2010/0064673 A1    Mar. 18, 2010

(30) Foreign Application Priority Data

Oct. 13, 2006  (DE) .......................... 10 2006 048 616

(51) Int. Cl.
*F01N 1/00* (2006.01)
*F16K 31/02* (2006.01)
*F16K 31/44* (2006.01)
(52) U.S. Cl. ...................... 60/324; 251/129.02; 251/242
(58) Field of Classification Search .................. 60/324; 251/129.02, 227, 242, 294, 305, 313, 337
See application file for complete search history.

(56) References Cited

U.S. PATENT DOCUMENTS

| 5,150,680 | A | * | 9/1992 | Nishimura | 123/399 |
| 6,855,091 | B1 |  | 2/2005 | Holmes |  |
| 2003/0127281 | A1 | * | 7/2003 | Bravo | 181/254 |
| 2005/0056010 | A1 | * | 3/2005 | Momosaki et al. | 60/312 |
| 2006/0272322 | A1 | * | 12/2006 | Abram et al. | 60/324 |

FOREIGN PATENT DOCUMENTS

| DE | 44 42 109 |  | 6/1995 |
| DE | 102004040818 A1 | * | 3/2006 |
| EP | 1 515 019 |  | 3/2005 |

OTHER PUBLICATIONS

Gerards et al., English Abstract of DE 10 2004 040 818 A1, Mar. 9, 2006.* Gerards et al., Machine Translation of DE 10 2004 040 818 A1, Mar. 9, 2006.*
Kusa et al., Machine Translation of DE 4442109 A1, Jun. 8, 1995.*
Search Report and Written Opinion for PCT/EP2007/008887.
International Preliminary Report on Patentability—English Translation, issued on May 5, 2009.

* cited by examiner

*Primary Examiner* — Thomas Denion
*Assistant Examiner* — Audrey K Bradley
(74) *Attorney, Agent, or Firm* — Carlson Gaskey Olds

(57) ABSTRACT

A valve device, in particular for an exhaust system of an internal combustion engine, has a valve flap which is arranged in a tube and can assume a basic position and an actuating position. A motor-driven valve drive that is arranged outside the tube and is coupled to a shaft of the valve flap by a force transmission element. A mechanical restoring element urges the valve flap into the basic position. The valve drive works against the mechanical restoring element as far as to the actuating position. A lever is connected to one end of the force transmission element and when in the actuating position of the valve flap, is in or near the dead-center position with respect to the force transmission direction from or to the force transmission element. In an alternative configuration, the lever is coupled to the shaft of the valve flap and, in the actuating position of the valve flap, is in a position in which the distance between the force transmission direction from or to the force transmission element and the pivot axis of the lever is at least approximately a maximum.

28 Claims, 4 Drawing Sheets ated shortly before the dead-center position, that is, never reach it.

VALVE DEVICE

RELATED APPLICATION

This application is the U.S. national phase of PCT/EP2007/008887, filed 12 Oct. 2007, which claimed priority to DE patent application 10 2006 048 616.1, filed 13 Oct. 2006.

TECHNICAL FIELD

The present invention relates to a valve device, in particular for an exhaust system of an internal combustion engine.

BACKGROUND OF THE INVENTION

DE 10 2004 040 818 A1 discloses a valve device which serves to maintain the backpressure in the exhaust system branch when individual cylinders in a large-volume motor vehicle engine are deactivated in specific driving situations. The valve device has a valve flap which is arranged in a tube and can assume an open basic position and a closed actuating position. A motor-driven valve drive is arranged outside the tube and exerts, via a Bowden cable, a tensile force on a lever connected to the shaft of the valve flap. The valve flap is moved to the actuating position against a mechanical restoring element which urges the valve flap into the basic position. Since the valve flap assumes its actuating position for a longer time during driving operation, the valve drive is required to work counter to the restoring force of the restoring element for long periods of time, which leads to high energy consumption.

It is therefore the object of the invention to provide a valve device having a valve drive which distinguishes itself by a particularly low energy consumption.

SUMMARY OF THE INVENTION

This object is achieved by a valve device which, in an actuating position of the valve flap, a lever is in or near a dead-center position with respect to the force transmission direction from or to the force transmission element. Within the meaning of the invention, the dead-center position is intended to mean the position in which the lever is in an unstable equilibrium, i.e. a position in which the line of action of the force applied to the lever runs through the pivot axis of the lever. In this position, the torque applied to the lever by the force transmission element is (theoretically) equal to zero since the associated lever arm is equal to zero (as, in fact, the force transmission direction runs through the pivot axis). As a result, the valve drive needs to apply (almost) no force in order to keep the lever and, hence, the valve flap in their respective positions. Accordingly, in a position of the lever near the dead-center position the torque applied to the lever by the force transmission element is small because the lever arm is also small. In particular, in the actuating position of the valve flap, the lever may be in a slight over-center position.

In this example configuration, the lever is arranged directly on a drive shaft of the valve drive.

According to the preferred embodiment, "near the dead-center position" means that in the actuating position the lever is situated in a range of ±15 degrees from the dead-center position. In particular, in the actuating position, the lever is at an angle of between 0 and 15 degrees to the dead-center position. Where a valve drive is employed which can move the valve flap only in one direction (namely, counter to the force exerted by the restoring element), in the actuating position of the valve flap the lever should be situated shortly before the dead-center position, that is, never reach it.

As an alternative, the above-mentioned object is also achieved by a valve device, in which the lever is coupled to the shaft of the valve flap and, in the actuating position of the valve flap, is in a position in which the distance between the force transmission direction from or to the force transmission element and the pivot axis of the lever is at least approximately a maximum. This is the case when the lever includes a right angle with the force transmission direction. In particular, in the actuating position of the valve flap, the lever is in a position approximately perpendicular to the dead-center position with respect to the force transmission direction from or to the force transmission element. In fact, since the distance between the force transmission direction and the pivot axis of the lever corresponds to the effective lever arm of the force exerted by the valve drive and transmitted by the force transmission element, the motor-driven valve drive needs to apply only a comparatively small force in order to overcome the given torque applied to the valve flap by the restoring element. Here, too, the range of tolerance preferably is ±15 degrees to the optimum position.

Thus, a feature that both configurations of the valve drive according to the invention have in common is that the position of the lever corresponding to the actuating position of the valve flap is selected such that the force to be applied by the valve drive counter to the restoring element is as small as possible. As related to the force transmission element, the lever may either be arranged on the side of the valve drive or on the side of the valve flap.

According to one variant of the invention, a control is provided for the motor-driven valve drive. The control switches the valve drive off when the valve flap is in the basic position. The control may also be designed such that the valve drive is switched off as soon as it is intended for the valve flap to assume the basic position; the valve flap is then moved to the basic position by the mechanical restoring element.

To avoid an undesirable noise development, the valve drive may be in a switched-on condition when the valve flap moves to the basic position, the valve drive generating a damping moment that counteracts the restoring element.

The restoring element is preferably arranged to move the valve flap to the basic position in case of failure of the valve drive. The restoring element thus fulfills a so-called "fail-safe" function.

At least outside the basic position, the valve drive should be in permanent operation and exert a force on the lever to ensure that the valve flap is reliably held in the actuating position.

According to a further development of the invention, a stop is provided against which the lever rests in the actuating position of the valve flap. In the case of a lever arranged on the drive shaft of the valve drive, it is then conceivable that in the actuating position of the valve flap, the lever assumes an over-center position in which it is held solely by the force exerted by the restoring element and transmitted by the force transmission element. The valve drive is then fully relieved. In this embodiment, however, the restoring element can not fulfill the above-mentioned fail-safe function.

In order to attain on the flap side a constant torque applied by the force transmission element, the shaft of the valve flap may be connected to the center of a roller, an end of the force transmission element being fixed in place on the periphery of the roller. In addition, this results in a large flap adjustment angle while, at the same time, the structural dimensions are small.

The restoring element is preferably a spring such as, e.g., a torsion spring or a helical spring, which distinguishes itself by its cost-effectiveness and reliability.

Since the components of an exhaust system are exposed to very high variations in temperature, according to a preferred embodiment provision is made that the force transmission element is coupled to the lever by a length compensator, in particular in the form of a spring. The length compensator compensates for thermally induced changes in length of the force transmission element.

Advantageously, the force transmission element is a wire of a Bowden cable which, owing to its flexibility, allows the valve drive to be arranged at a relatively great distance from the valve flap in an area in which lower temperatures prevail. In addition, a Bowden cable is exceptionally simple to assemble.

To avoid friction between the wire and the exit edge of the sheath of the Bowden cable, the sheath of the Bowden cable may be pivotally mounted on the end facing the lever.

Furthermore, in the basic position the valve flap may press against a stop, whereby the valve flap is prevented from moving beyond its basic position when the valve drive is switched off. In addition, a further stop may be provided against which the valve flap presses in the actuating position.

Preferably, a valve drive is employed which acts only in one sense of rotation and works against the restoring element.

These and other features of the present invention can be best understood from the following specification and drawings, the following of which is a brief description.

BRIEF DESCRIPTION OF THE DRAWINGS

Further features and advantages of the invention will be apparent from the following description of a plurality of preferred embodiments with reference to the accompanying drawings, in which.

DETAILED DESCRIPTION OF THE EMBODIMENT

Figure 1:
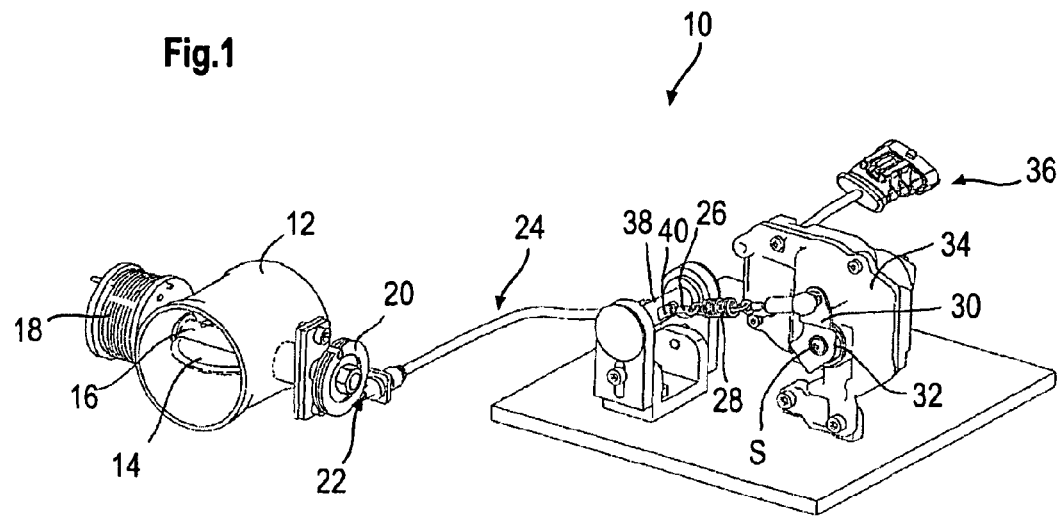
FIG. 1 shows a perspective view of a valve device according to a first embodiment of the invention, with the valve flap in the basic position.
Figure 5:
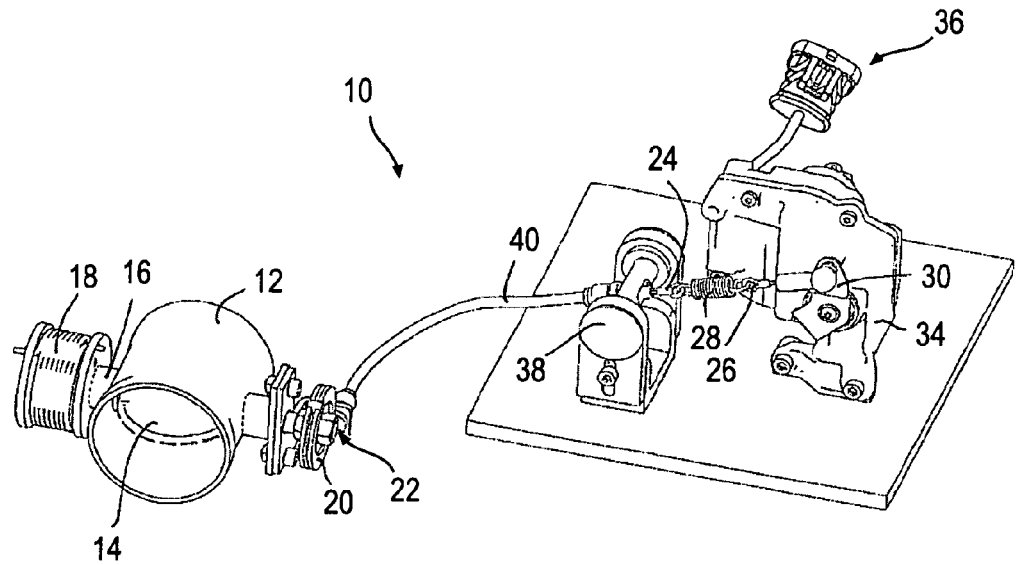
FIG. 5 shows a perspective view of the valve device of FIG. 1, with the valve flap in the basic position.

FIGS. 1 and 5 show a valve device 10 according to a first embodiment of the invention, which is typically arranged in a multi-branch exhaust system of a motor vehicle or inside a muffler to control the exhaust gas there between different flow paths. The valve device 10 comprises a valve flap 14 which is arranged in a tube 12, such as an exhaust tube for example, and which is mounted by a shaft 16 perpendicularly to the longitudinal direction of the tube 12. A first end of the shaft 16 is coupled to a mechanical restoring element 18, such as a torsion spring for example, which urges the shaft 16 and, hence, the valve flap 14 into the open basic position shown in FIG. 1. The other end of the shaft 16 is connected to a center of roller 20. A first end 22 of a force transmission element 24, in this example formed by a wire of a Bowden cable, is fastened to a periphery of the roller 20. The second end 26 of the force transmission element 24 is connected to a lever 30 by a (purely optional) length compensator 28 in the form of a helical spring. The lever 30 is fastened to a drive shaft 32 of an electric-motor valve drive 34, with the axis of rotation of the drive shaft 32 corresponding to the pivot axis S of the lever 30. Reference numeral 36 denotes a connection to a control for the motor-driven valve drive 34, with the control switching the valve drive 34 off at least when the valve flap 14 is in the basic position.

Further provision is made for a rotatably mounted spindle 38 on which a sheath 40 of the Bowden cable is pivotally mounted on the second end 26 of the force transmission element 24 facing the lever 30, so that the angle of the wire, which varies due to different lever positions, always corresponds to the angle of the sheath 40.

Figure 2:
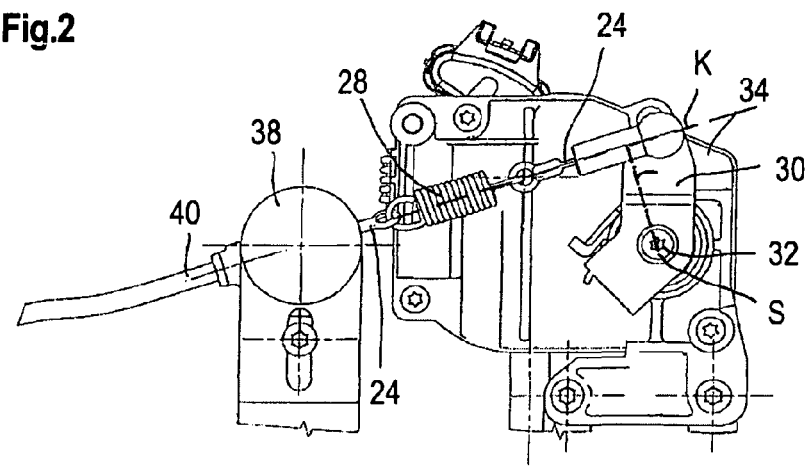
FIG. 2 shows a view of the valve drive and the lever of the valve device of FIG. 1, likewise with the valve flap in the basic position.

As can be seen in FIG. 2, in the basic position of the valve flap 14 the lever 30 is in an approximately vertical position, in which the force transmission direction K (or line of action of the force) from or to the force transmission element 24 is at a comparatively great distance a from the pivot axis S of the lever 30. It should be understood that the position of the lever 30 in the basic position of the valve flap 14 results automatically from the desired position of the lever 30 in the actuating position when taking appropriate system parameters into account (length of the lever 30, angle of rotation between the basic and actuating positions, power of the motor-driven valve drive, etc.).

When the vehicle is in operation, phases occur now and then in which it is desired for the valve flap 14 to assume a closed position. For this purpose, the valve drive 34 is actuated, the drive shaft 32 of which rotates clockwise, thereby exerting a tensile force via the lever 30 on the force transmission element 24, here the wire of the Bowden cable. The length compensator 28 is not stretched in the process since it is designed to be harder, more resistant than the restoring element 18.

Figure 3:
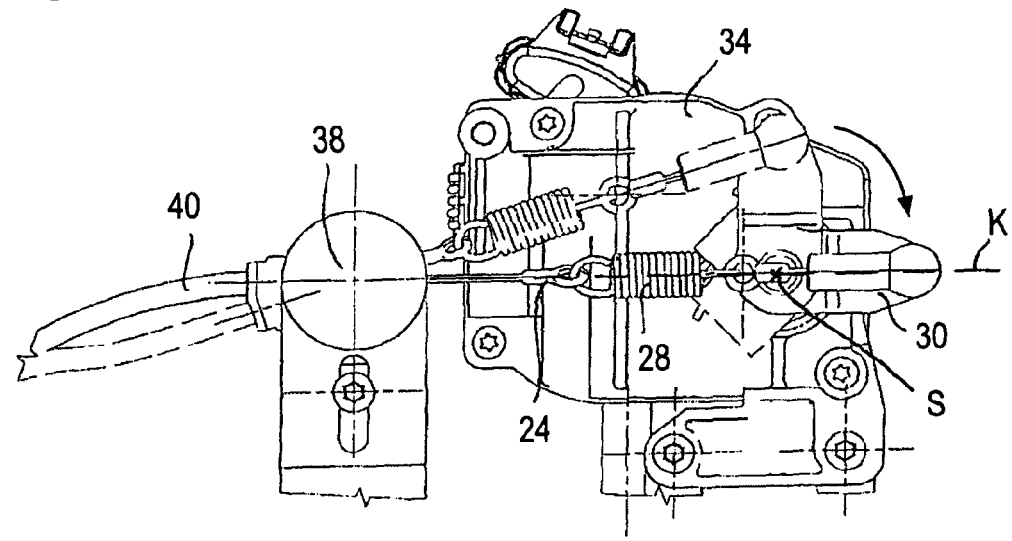
FIG. 3 shows a view of the valve drive of FIG. 2 in the transition from the basic position to the actuating position of the valve flap.
Figure 4:
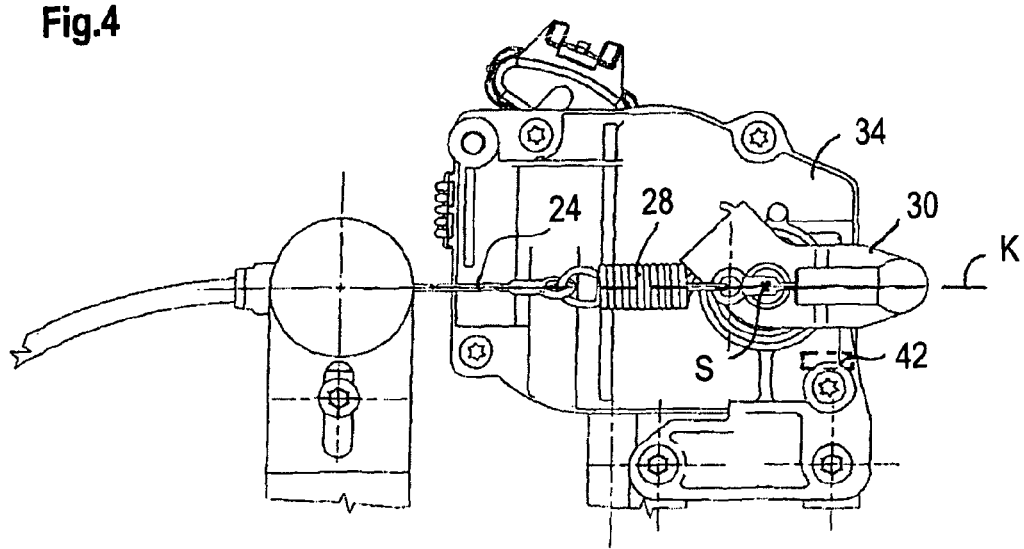
FIG. 4 shows a view of the valve drive of FIG. 2, but with the lever in a dead-center position corresponding to the actuating position of the valve flap.
Figure 6:
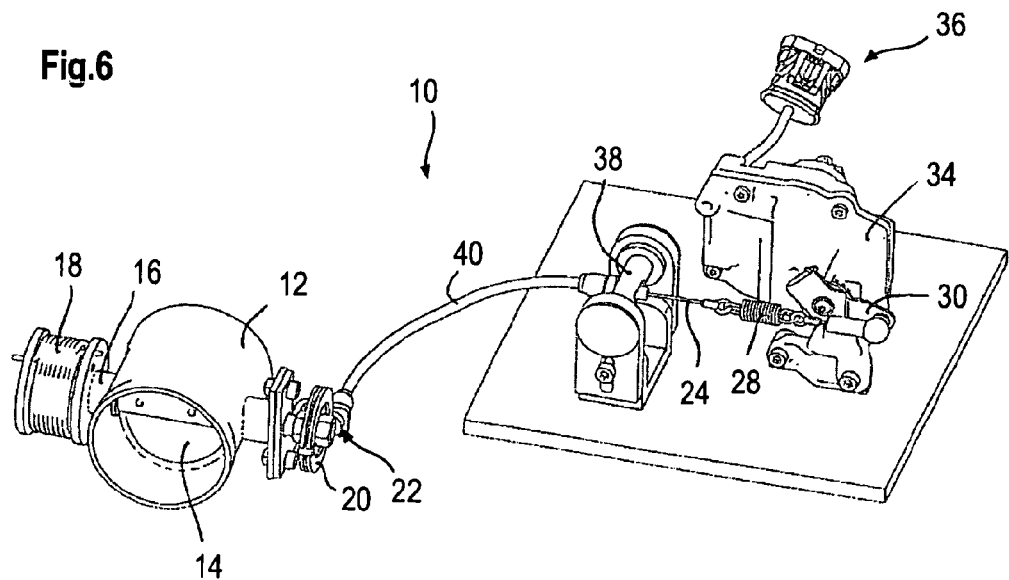
FIG. 6 shows a perspective view similar to that of FIG. 5, but with the valve flap in the actuating position.

The tensile force generated by the valve drive 34 causes—at the first end 22 of the force transmission element 24—the roller 20 to rotate, the wire to unwind and, thus, the valve flap 14 to pivot counter to the force of the restoring element 18, as a result of which the valve flap 14 is moved to the closed actuating position shown in FIGS. 3, 4, and 6. To hold the valve flap 14 in the actuating position, the valve drive 34 is required to constantly work against the mechanical restoring element 18. Therefore, the valve drive 34 is permanently in operation, at least outside the basic position of the valve flap 14, and exerts a force on the lever 30.

As is apparent from FIGS. 3 and 4 in particular, in the actuating position of the valve flap 14 the lever 30 assumes a position (in this case horizontal) in which the force transmission direction K (or line of action of the tensile force) extends through the pivot axis S, that is, the axis of rotation of the drive shaft 32. The lever 30 is thus in its dead-center position, in which the restoring torque that is applied by the restoring element 18 and transmitted to the lever 30 by the force transmission element 24 is (theoretically) equal to zero. After the dead-center position shown is reached, the valve drive 34, which works against the restoring element 18, therefore needs to apply no, or next to no, energy any more to hold the lever 30 in this position.

To return the valve flap 14 from the actuating position to the basic position, it is sufficient to switch the valve drive 34 off, whereupon the restoring element 18 restores the valve flap 14. In the process, the valve drive 34 may counteract by applying a small load to obtain a damping of the restoring motion. In case of a failure of the valve drive 34, the valve flap 14 will also be moved to the basic position; therefore, the restoring element 18 here also has a fail-safe function.

Deviating from the dead-center position shown in FIGS. 3 and 4, the lever 30 may also be situated as much as ±15 degrees away from the dead-center position in the actuating position of the valve flap 14, as a result of which the torque to be applied by the valve drive 34 against the restoring element 18 is still very small owing to the small lever arm "a." In particular, in the actuating position of the valve flap 14 the lever 30 may assume an over-center position, in which it rests against a stop 42 (see FIG. 4, illustrated in dashed lines). Additionally or alternatively, an appropriate stop may also be provided in the area of the valve flap 14. In the over-center position the lever 30 is held solely by the restoring element 18, which, in fact, exerts a tensile force, acting to the left in the Figure, on the force transmission element 24. The valve drive 34 could also be switched off in this position. This switching-off may be affected when, in the actuating position, the valve flap 14 or the lever 30 is pressed against the stop, as a result of which the valve drive 34 will draw an excessive amount of current, which is an indication of the actuating position. To move the valve flap 14 from the actuating position back to the basic position, the valve drive 34 has to apply a counter-torque, at least until the lever 30 has overcome the dead-center position again. A configuration of this type is advantageous to applications in which upon failure of the drive the valve flap 14 is to remain in its current position.

In the case of a valve drive 34 which can be operated only in one direction (namely, counter to the restoring element 18), it is of advantage if, in the actuating position of the valve flap 14, the lever 30 remains shortly before the dead-center position, i.e. above the horizontal line in this case.

A further stop (not shown) is arranged in the area of the valve flap 14 (or the shaft 16), the valve flap 14 pressing against this stop in the basic position. This stop allows the restoring element 18 to be pretensioned as early as in the basic position of the valve flap 14, whereby the valve flap 14 is prevented from oscillating about the basic position. Another stop may be provided for the valve flap 14 to rest against in the actuating position.

Figure 7:
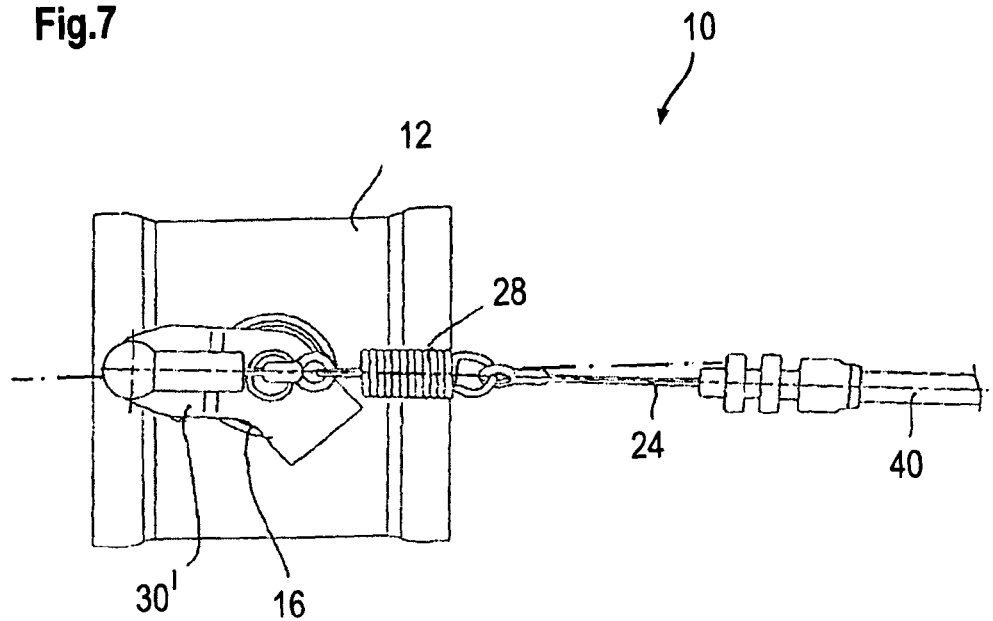
FIG. 7 shows a view of a lever which, in accordance with a second embodiment of the invention, is coupled to the shaft of the valve flap, with the valve flap in a basic position.
Figure 8:
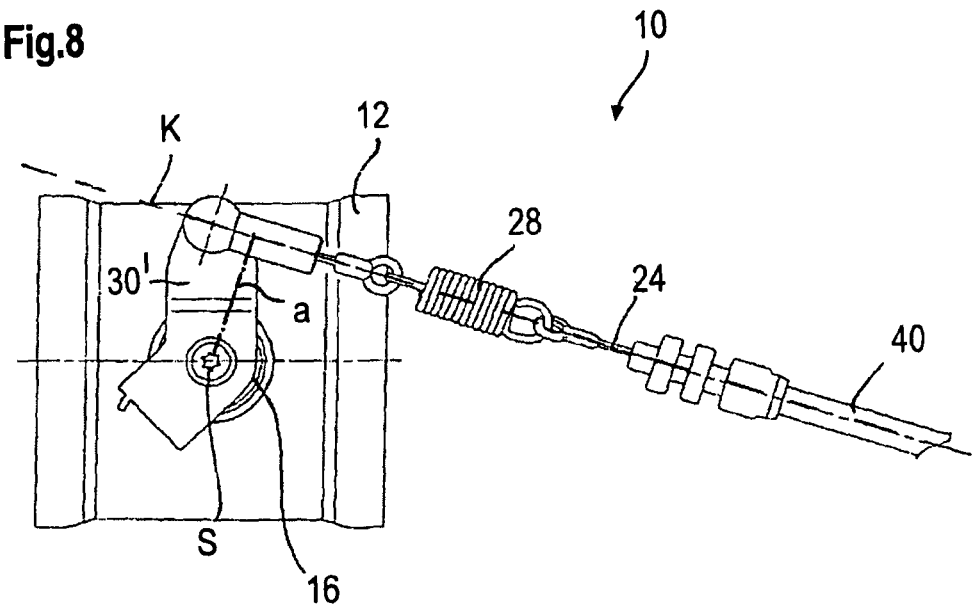
FIG. 8 shows a view of the lever of FIG. 7, but with the valve flap in an actuating position.

FIGS. 7 and 8 show a second embodiment of a valve device 10 according to the present invention; identical or functionally identical components will be denoted by the same reference numerals below and only the differences from the previously described embodiment will be discussed. In the embodiment of FIGS. 7 and 8, the lever 30' is connected to the shaft 16 of the valve flap 14, rather than to the drive shaft 32 of the valve drive 34. In the basic position of the valve flap 14 (see FIG. 7), the lever 30' is in a position just above the horizontal line. In the actuating position (see FIG. 8), the position of the lever 30' is selected such that the distance "a" of the force transmission direction K from the pivot axis S' of the lever, which corresponds to the axis of rotation of the shaft 16 here, is as large as possible. Here, this position is roughly perpendicular to the dead-center position of the lever 30'. Of course, a range of tolerance of ±15 degrees in relation to the optimum orientation of the lever 30' is possible in this case, too. As a result, the tensile force applied by the valve drive 34 to the lever 30' by the force transmission element 24 has a particularly large lever arm "a", for which reason a comparatively small tensile force is sufficient to compensate for the restoring torque generated by the restoring element 18 and to hold the lever 30' and, hence, the valve flap 14 in the actuating position. In connection with this embodiment it should be noted that in the basic position of the valve flap 14, the lever 30' must not assume the (horizontal) dead-center position since in that case the tensile force to be applied by the valve drive 34 for moving the lever 30' would be infinitely large.

In both embodiments, the basic position of the valve flap 14 may, of course, be a closed position and the actuating position an open position.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A valve device for an exhaust system of an internal combustion engine, comprising:
    a valve flap arranged in a tube to assume a basic position and an actuating position;
    a motor-driven valve drive arranged outside the tube and which is coupled to a shaft of the valve flap by a force transmission element;
    a mechanical restoring element that urges the valve flap into the basic position, and wherein the motor-driven valve drive works against the mechanical restoring element as far as to the actuating position; and
    a lever arranged on a drive shaft of the motor-drive valve drive and connected to one end of the force transmission element, wherein in the actuating position of the valve flap, the lever is in or near a dead-center position with respect to a force transmission direction from or to the force transmission element.

2. The valve device according to claim 1, wherein in the actuating position, the lever is situated in a range of ±15 degrees from the dead-center position.

3. The valve device according to claim 1, wherein a control is provided for the motor-driven valve drive, the control switching the motor-driven valve drive off when the valve flap is in the basic position.

4. The valve device according to claim 1, wherein the mechanical restoring element is arranged to move the valve flap to the basic position in case of failure of the motor-driven valve drive.

5. The valve device according to claim 1, wherein at least outside the basic position, the motor-driven valve drive is in permanent operation and exerts a force on the lever.

6. The valve device according to claim 1, including a stop against which the lever rests in the actuating position of the valve flap.

7. The valve device according to claim 1, wherein the basic position the valve flap presses against a stop.

8. The valve device according to claim 1, wherein the motor-driven valve drive acts only in one direction of rotation.

9. The valve device according to claim 1, wherein the basic position comprises an open position and the actuating position comprises a closed position.

10. The valve device according to claim 1, wherein the lever defines a pivot axis and wherein a force transmission direction extends through the pivot axis when in the actuating position.

11. The valve device according to claim 1, wherein the lever defines a pivot axis, and wherein the force transmission direction is defined at a connection of the lever to the force transmission element, and wherein the force transmission direction extends along a line of action of the force such that the line of action intersects the pivot axis at only one of the actuating and basic positions.

12. The valve device according to claim 1, wherein in the basic position of the valve flap, the lever is in a position in which a distance between the force transmission direction from or to the force transmission element and the pivot axis of the lever is at least approximately a maximum.

13. The valve device according to claim 1, wherein the force transmission element is a wire of a Bowden cable.

14. The valve device according to claim 13, wherein a sheath of the Bowden cable is pivotally mounted on an end facing the lever.

15. The valve device according to claim 1, wherein the mechanical restoring element is a spring.

16. The valve device according to claim 15, wherein the mechanical restoring element is a torsion spring.

17. The valve device according to claim 15, wherein the mechanical restoring element is a helical spring.

18. A valve device for an exhaust system of an internal combustion engine, comprising:
   a valve flap arranged in a tube to assume a basic position and an actuating position;
   a motor-driven valve drive arranged outside the tube and which is coupled to a shaft of the valve flap by a force transmission element;
   a mechanical restoring element that urges the valve flap into the basic position, and wherein the motor-driven valve drive works against the mechanical restoring element as far as to the actuating position; and
   a lever connected to the force transmission element at one end and coupled to the shaft of the valve flap at another end, wherein in the actuating position of the valve flap, the lever is in a position in which a distance between a force transmission direction from or to the force transmission element and the pivot axis of the lever is at least approximately a maximum, and wherein in the basic position the lever is near a horizontal position without assuming the horizontal position.

19. The valve device according to claim 18, wherein the basic position comprises a closed position and the actuating position comprises an open position, and wherein a force transmission direction extends through the pivot axis when in the closed position.

20. The valve device according to claim 18, wherein when the valve flap moves to the closed position, the motor-driven valve drive is in a switched-on condition and generates a damping moment that counteracts the mechanical restoring element.

21. The valve device according to claim 18, wherein the force transmission element is coupled to the lever by a length compensator comprising a spring.

22. The valve device according to claim 18, wherein the lever defines a pivot axis, and wherein the force transmission direction is defined at a connection of the lever to the force transmission element, and wherein the force transmission direction extends along a line of action of the force such that the line of action intersects the pivot axis at only one of the actuating and basic positions.

23. A valve device for an exhaust system of an internal combustion engine, comprising:
   a valve flap arranged in a tube to assume a basic position and an actuating position;
   a motor-driven valve drive arranged outside the tube and which is coupled to a shaft of the valve flap by a force transmission element;
   a mechanical restoring element that urges the valve flap into the basic position, and wherein the motor-driven valve drive works against the mechanical restoring element as far as to the actuating position; and
   a lever connected to one end of the force transmission element, wherein in the actuating position of the valve flap, the lever is in or near a dead-center position with respect to a force transmission direction from or to the force transmission element, and wherein the force transmission element is coupled to the lever by a length compensator comprising a spring.

24. A valve device for an exhaust system of an internal combustion engine, comprising:
   a valve flap arranged in a tube to assume a basic position and an actuating position;
   a motor-driven valve drive arranged outside the tube and which is coupled to a shaft of the valve flap by a force transmission element;
   a mechanical restoring element that urges the valve flap into the basic position, and wherein the motor-driven valve drive works against the mechanical restoring element as far as to the actuating position; and
   a lever connected to one end of the force transmission element, wherein in the actuating position of the valve flap, the lever is in or near a dead-center position with respect to a force transmission direction from or to the force transmission element, and wherein the shaft of the valve flap is connected to a center of a roller, and an end of the force transmission element is fixed in place on a periphery of the roller.

25. A valve device for an exhaust system of an internal combustion engine, comprising:
   a valve flap arranged in a tube to assume a basic position and an actuating position;
   a motor-driven valve drive arranged outside the tube and which is coupled to a shaft of the valve flap by a force transmission element;
   a mechanical restoring element that urges the valve flap into the basic position, and wherein the motor-driven valve drive works against the mechanical restoring element as far as to the actuating position; and
   a lever connected to one end of the force transmission element, wherein in the actuating position of the valve flap, the lever is in or near a dead-center position with respect to a force transmission direction from or to the force transmission element wherein when the valve flap moves to the basic position, the motor-driven valve drive is in a switched-on condition and generates a damping moment that counteracts the mechanical restoring element.

26. A valve device for an exhaust system of an internal combustion engine, comprising:
   a valve flap arranged in a tube to assume a basic position and an actuating position;
   a motor-driven valve drive arranged outside the tube and which is coupled to a shaft of the valve flap by a force transmission element;
   a mechanical restoring element that urges the valve flap into the basic position, and wherein the motor-driven valve drive works against the mechanical restoring element as far as to the actuating position; and
   a lever connected to the force transmission element at one end and coupled to the shaft of the valve flap at another end, wherein in the actuating position of the valve flap, the lever is in a position in which a distance between a force transmission direction from or to the force transmission element and the pivot axis of the lever is at least approximately a maximum, and wherein when the valve flap moves to the basic position, the motor-driven valve drive is in a switched-on condition and generates a damping moment that counteracts the mechanical restoring element.

27. A valve device for an exhaust system of an internal combustion engine, comprising:
a valve flap arranged in a tube to assume a basic position and an actuating position;
a motor-driven valve drive arranged outside the tube and which is coupled to a shaft of the valve flap by a force transmission element;
a mechanical restoring element that urges the valve flap into the basic position, and wherein the motor-driven valve drive works against the mechanical restoring element as far as to the actuating position; and
a lever connected to the force transmission element at one end and coupled to the shaft of the valve flap at another end, wherein in the actuating position of the valve flap, the lever is in a position in which a distance between a force transmission direction from or to the force transmission element and the pivot axis of the lever is at least approximately a maximum, and wherein the shaft of the valve flap is connected to a center of a roller, and an end of the force transmission element is fixed in place on a periphery of the roller.

28. A valve device for an exhaust system of an internal combustion engine, comprising:
a valve flap arranged in a tube to assume a basic position and an actuating position;
a motor-driven valve drive arranged outside the tube and which is coupled to a shaft of the valve flap by a force transmission element;
a mechanical restoring element that urges the valve flap into the basic position, and wherein the motor-driven valve drive works against the mechanical restoring element as far as to the actuating position; and
a lever connected to the force transmission element at one end and coupled to the shaft of the valve flap at another end, wherein in the actuating position of the valve flap, the lever is in a position in which a distance between a force transmission direction from or to the force transmission element and the pivot axis of the lever is at least approximately a maximum, and wherein the force transmission element is coupled to the lever by a length compensator comprising a spring.

* * * * *